United States Patent
Crate (10) Patent No.: US 11,625,914 B2
(45) Date of Patent: Apr. 11, 2023

(54) KEY TERRAIN FINDER

(71) Applicant: Raytheon Company, Waltham, MA (US)

(72) Inventor: Sarah A. Crate, Wylie, TX (US)

(73) Assignee: Raytheon Company, Waltham, MA (US)

( * ) Notice: Subject to any disclaimer, the term of this patent is extended or adjusted under 35 U.S.C. 154(b) by 290 days.

(21) Appl. No.: 17/064,308

(22) Filed: Oct. 6, 2020

(65) Prior Publication Data

US 2021/0174081 A1 Jun. 10, 2021

Related U.S. Application Data

(60) Provisional application No. 62/946,271, filed on Dec. 10, 2019.

(51) Int. Cl.

| | |
|---|---|
| *G06V 20/10* | (2022.01) |
| *G06F 16/29* | (2019.01) |
| *G06F 16/2457* | (2019.01) |
| *G06V 10/56* | (2022.01) |
| *G06V 10/75* | (2022.01) |
| *G06V 20/13* | (2022.01) |
| *G06F 16/587* | (2019.01) |

(52) U.S. Cl.
CPC ...... *G06V 20/188* (2022.01); *G06F 16/24578* (2019.01); *G06F 16/29* (2019.01); *G06V 10/56* (2022.01); *G06V 10/751* (2022.01); *G06V 20/13* (2022.01); *G06F 16/587* (2019.01)

(58) Field of Classification Search
CPC .... G06V 20/188; G06V 10/56; G06V 10/751; G06V 20/13; G06F 16/24578; G06F 16/29; G06F 16/587
See application file for complete search history.

(56) References Cited

U.S. PATENT DOCUMENTS

| | | | |
|---|---|---|---|
| 8,774,470 B1* | 7/2014 | Schmidt | G06T 7/143 382/113 |
| 10,909,662 B1* | 2/2021 | Chartrand | G06V 10/768 |
| 2018/0218214 A1* | 8/2018 | Pestun | G06T 17/05 |
| 2021/0027531 A1* | 1/2021 | Liu | A63F 13/80 |

* cited by examiner

*Primary Examiner* — Ping Y Hsieh
*Assistant Examiner* — Daniella M. DiGuglielmo
(74) *Attorney, Agent, or Firm* — Schwegman Lunberg & Woessner, P.A.

(57) ABSTRACT

Systems, devices, media and methods are presented for identifying key terrain areas in a geographic location by accessing an image comprising a view of the geographic location comprising a plurality of terrain areas and for each terrain area, assigning a first score corresponding to positive or negative key terrain determinations using a general rule, assigning a second score corresponding to positive or negative key terrain determinations using an override rule, assigning a third score corresponding to positive or negative key terrain determinations using a user-defined rule and generating an aggregate mask to assign the key terrain area with an aggregate score. Based on the aggregate score, key terrain areas are identified and displayed on a computing device.

20 Claims, 9 Drawing Sheets

KEY TERRAIN FINDER

CROSS-REFERENCE TO RELATED APPLICATION

This patent application claims the benefit of priority to U.S. Provisional Application Ser. No. 62/946,271, filed Dec. 10, 2019, which is incorporated by reference herein in its entirety.

TECHNICAL FIELD

Embodiments of the present disclosure relate generally to image processing. More particularly, but not by way of limitation, the present disclosure addresses systems and method for determining key terrain using an image of a geographic location.

BACKGROUND

Key terrain may be defined as any area that if held during combat, would provide a significant advantage, and if lost, would be a significant disadvantage. Identifying key terrain may be reliant on various factors unique to a specific task or geographic location.

SUMMARY

The apparatus is configured to identify key terrain areas in a geographic location by accessing an image comprising a view of the geographic location, the geographic location comprising a plurality of terrain areas. For each terrain area in the plurality of terrain areas, the apparatus assigns a first score corresponding to positive or negative key terrain determinations based on a general mask, assigns a second score corresponding to positive or negative key terrain determinations based on an override mask, assigns a third score corresponding to user-defined key terrain determinations based on a user-defined mask, and generates an aggregate mask to assign the terrain area with an aggregate score based on the first score, the second score and the third score. Based on a determination that the aggregate scores exceed a threshold score, the apparatus identifies some terrain areas in the plurality of terrain areas as key terrain areas, and encodes signaling for displaying the image comprising the identified key terrain areas on a graphical user interface of a computing device.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

The present disclosure addresses searching for and identifying key terrain in a geographic location based on a set of rules. By eliminating areas that are definitely not key terrain, analysts and users can focus on potential key terrain areas and evaluate them for less concrete criteria.

The description that follows includes systems, methods, techniques, instruction sequences, and computing machine program products illustrative of embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

A key terrain finder system may access an image of a geographic location. For each terrain area in the geographic location, the key terrain finder system may apply a set of rules. Each rule marks the terrain as 0 (e.g., not key terrain) or $2^n$ (e.g., possible key terrain), where N is an incremental counter for the rule. As such, the key terrain finder system may apply a first set of general rules to eliminate common non-key terrain areas. The general rule masks are summed to generate an initial estimation of key terrain areas. The key terrain finder system may further apply a second set of override rules which are used to generate override masks. The override rules use logic to override general rules. The key terrain finder system finder system may further apply a third set of user-defined rules which are used to generate user-defined masks. The user-defined rules allow the user to input user-specific or task-specific information. The key terrain finder system generates a final key terrain mask which, in some embodiments, is a summation of the general rule masks, the override masks and the user-defined masks. In some such embodiment, the final key terrain mask comprises mask values which represent unique sums of all the masks that contributed to the final key terrain mask and therefore preserves information pedigree. In some other embodiments, the final key terrain mask may be generated based on a specific operational combination of the general rule masks, the override masks and the user-defined masks. The key terrain finder system applies the final key terrain mask to the image to identify key terrain areas.

Key terrain affords a marked advantage to the combatant who seizes, retains or controls it. For example, a terrain feature may be a natural or manmade terrain feature which, if control, will give a marked advantage to whomever controls it. Key terrain may be analyzed in light of the mission of the unit, the type of operation, the level of command, the composition of forces involved, and the weapons and equipment expected to be encountered. High grounds such as hilltops along an avenue of approach or a river fording site along an avenue of approach are common key terrain areas. An avenue of approach may be an air or ground route of an attacking force leading to key terrain. Additional key terrain areas may be those terrain areas which are required for support by fires position, observation of the opposing force or an area required for the safe passage of forces.

For example, if a hill offers clear observation and fields of fire, it is of no marked advantage to the unit that controls it if the opposition can easily bypass it on another avenue of approach. On the other hand, if the hilltop affords cover and concealment, observation, and good fields of fire on multiple avenues of approach or is the only avenue of approach in the area, the terrain offers a definite advantage to whomever controls it.

In another example, an area where several trails converge may be key terrain for an anti-armor platoon, whereas an area in which several battalion-size avenues of approach join may be key terrain area for an anti-armor company.

Thus, identifying key terrain is a complex task which poses many technical challenges. The paragraphs below describe a key terrain finder system which identifies key terrain in a given geographic location.

Figure 1:
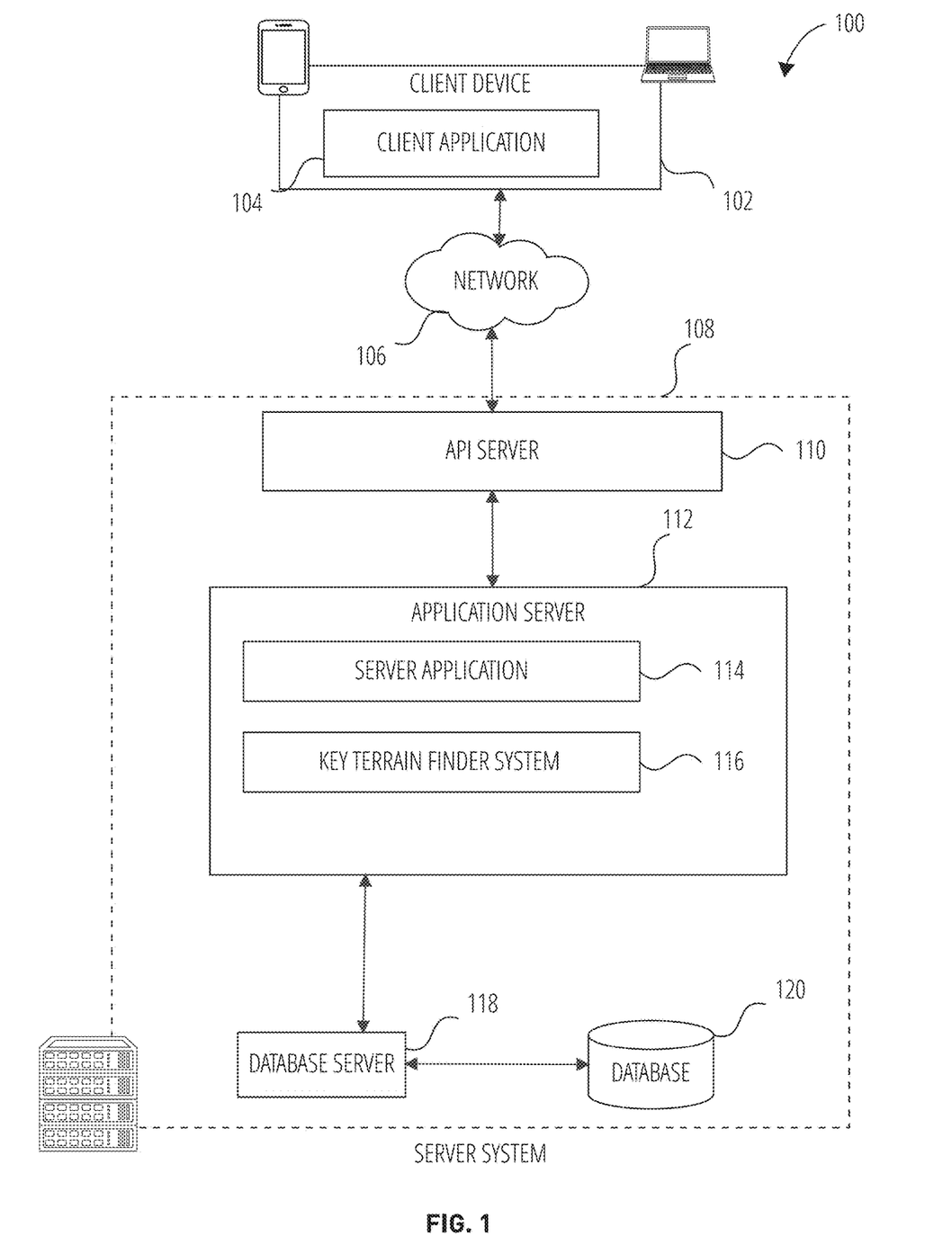
FIG. 1 is a diagrammatic representation of a networked environment in which the present disclosure may be deployed, in accordance with some example embodiments.

FIG. 1 is a block diagram showing an example system 100 for exchanging data (e.g., messages and associated content) over a network. The system 100 includes multiple instances of a client device 102, each of which hosts a number of applications including a client application 104. Each client application 104 is communicatively coupled to other instances of the client application 104 and a server system 108 via a network 106 (e.g., the Internet).

A client application 104 is able to communicate and exchange data with another client application 104 and with the server system 108 via the network 106. The data exchanged between client application 104, and between a client application 104 and the server system 108, includes functions (e.g., commands to invoke functions) as well as payload data (e.g., text, audio, video or other multimedia data).

The server system 108 provides server-side functionality via the network 106 to a particular client application 104. While certain functions of the system 100 are described herein as being performed by either a client application 104 or by the server system 108, the location of certain functionality either within the client application 104 or the server system 108 is a design choice. For example, it may be technically preferable to initially deploy certain technology and functionality within the server system 108, but to later migrate this technology and functionality to the client application 104 where a client device 102 has a sufficient processing capacity.

The server system 108 supports various services and operations that are provided to the client application 104. Such operations include transmitting data to, receiving data from, and processing data generated by the client application 104. This data may include, message content, client device information, geolocation information, as examples. Data exchanges within the system 100 are invoked and controlled through functions available via user interfaces (UIs) of the client application 104.

Turning now specifically to the server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

The Application Program Interface (API) server 110 receives and transmits message data (e.g., commands and message payloads) between the client device 102 and the application server 112. Specifically, the Application Program Interface (API) server 110 provides a set of interfaces (e.g., routines and protocols) that can be called or queried by the client application 104 in order to invoke functionality of the application server 112. The Application Program Interface (API) server 110 exposes various functions supported by the application server 112.

The application server 112 hosts a number of applications and subsystems, including a server application 114, a key terrain finder system 116.

The server application 114 implements a number of data processing technologies and functions. Other processor and memory intensive processing of data may also be performed server-side by the server application 114, in view of the hardware requirements for such processing.

The key terrain finder system 116 supports various data processing services and makes these functions and services available to the server application 114. To this end, the key terrain finder system 116 maintains and accesses key terrain data within the database 120. Examples of functions and services supported by the key terrain finder system 116 include generating an image of identified key terrain areas within a geographic location.

The key terrain finder system 116 may identify key terrain areas from an image of a geographic location. The key terrain finder system 116 accesses image masks correlating to specific rules for identifying key terrain. The key terrain finder system 116 creates a final mask which represents a summation of each of the image masks. The final mask is applied to the image and displayed on a graphical user interface of a computing device. The key terrain finder system 116 may further preserve the pedigree of the image data. For examples, the key terrain finder system 116 may preserve an understanding of how the identified key terrain areas were determined based on a unique mask value generated by the various masks applied to the image. Further details of the key terrain finder system 116 are described below in connection with FIGS. 2-7.

The application server 112 is communicatively coupled to a database server 118, which facilitates access to a database 120 in which is stored data associated with messages processed by the server application 114.

Figure 2:
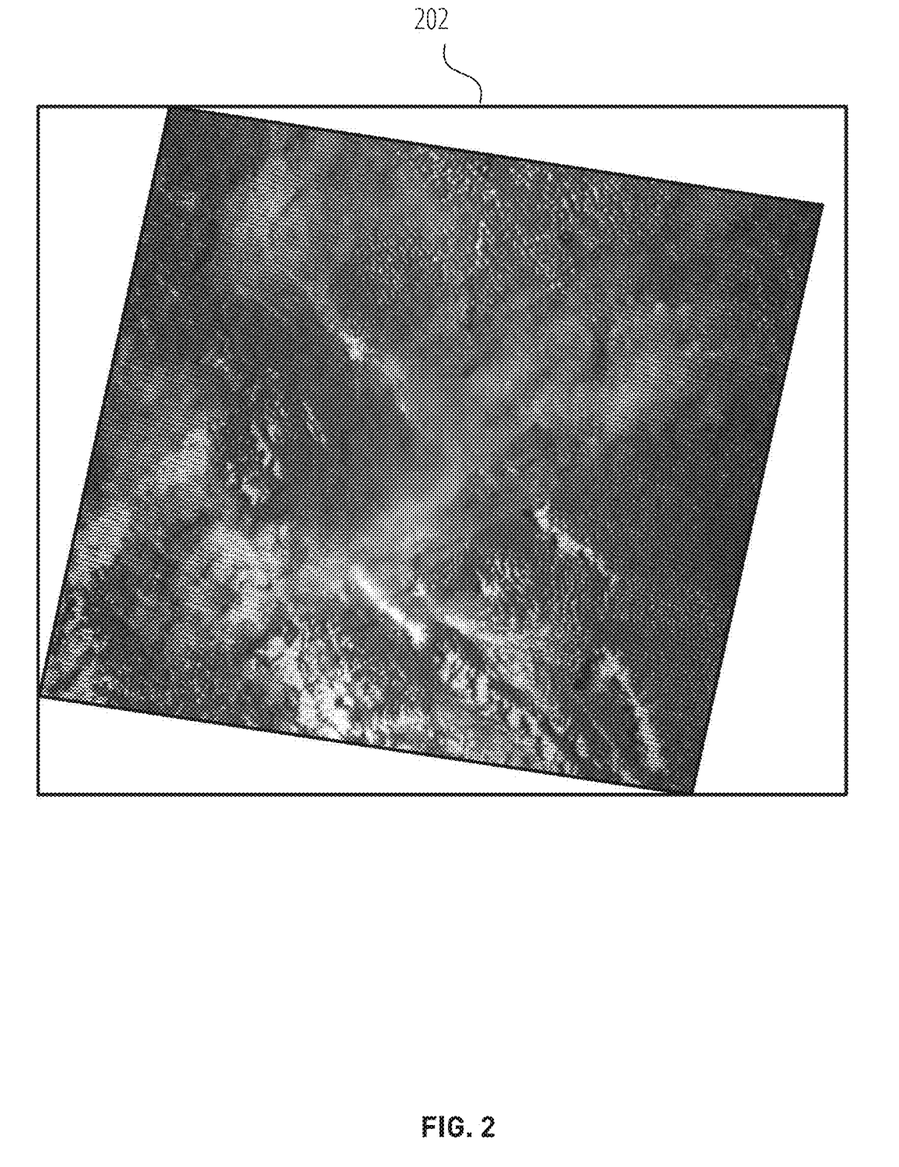
FIG. 2 is an illustration of an input image, according to some example embodiments.

FIG. 2 is an illustration of a panchromatic (PAN) image 202 of a geographic location. In one example, the image is a panchromatic image. In some examples, the image of the geographic location is a multi-spectral image. The imagery of the geographic location may be input to the key terrain finder system 116 to determine key terrain areas within the geographic location. The key terrain finder system 116 may access the imagery of the geographic location from a database 120 or third-party applications 840.

Figure 3:
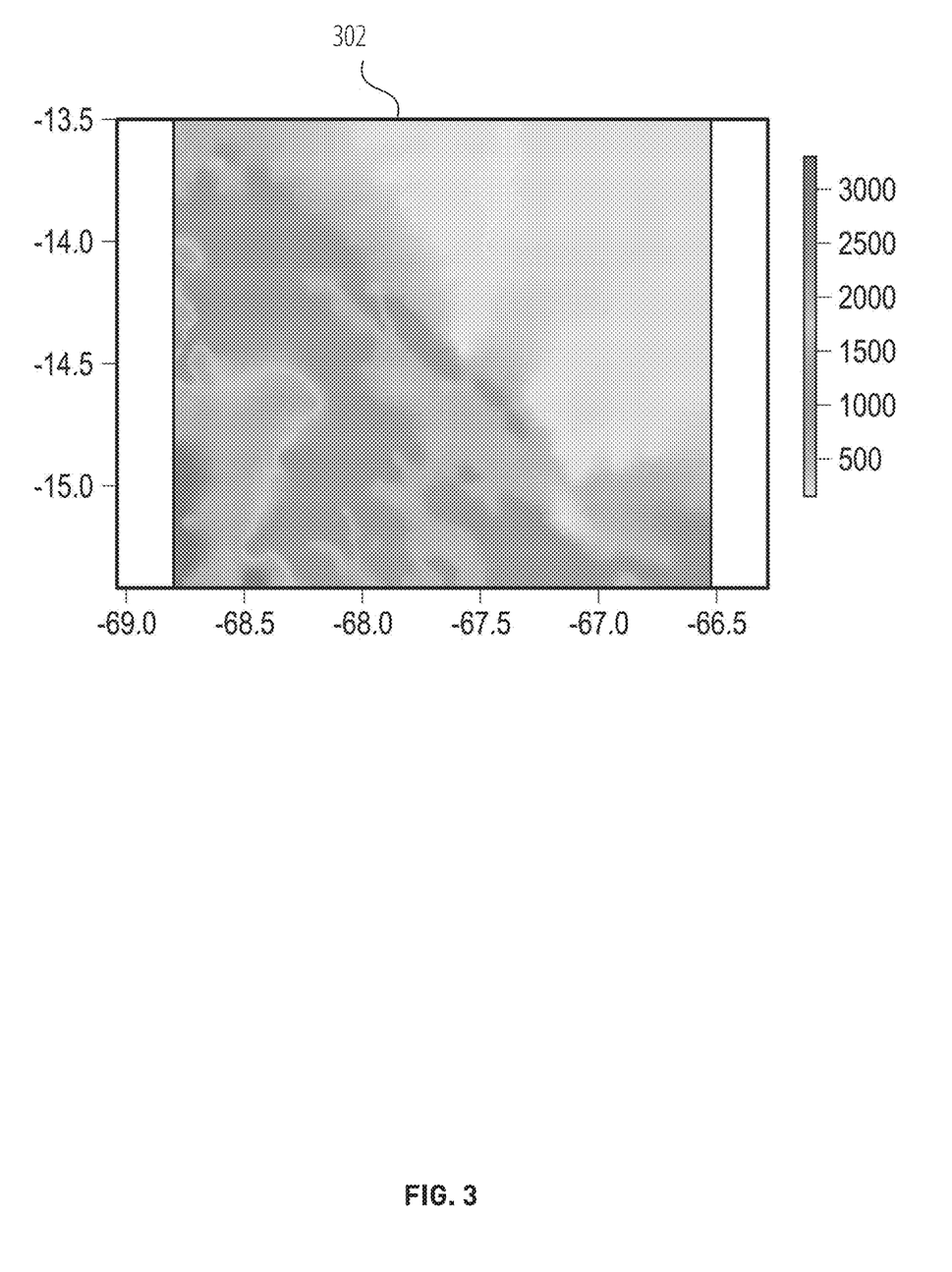
FIG. 3 is an illustration of an input image, according to some example embodiments.

FIG. 3 is an illustration of elevation data 302. The elevation data 302 may be provided as an input to the key terrain finder system 116. In some examples, the key terrain finder system 116 accesses imagery of the geographic location, such as the PAN image 202 and extracts elevation data 302 from that image. In some examples, the key terrain finder system 116 is provided with imagery of the geographic location (e.g., PAN image 202) and elevation data 302 as two separate input data files.

In some examples the key terrain finder system 116 accepts a non-image file describing the geographic location as input. As an example, the key terrain finder system 116 may accept NDIFF, Shapefile, or CSV filetypes as input. The key terrain finder system 116 uses the input file(s) to determine key terrain areas within the geographic location.

In order to identify key terrain areas, a set of rules are applied to the input data. The key terrain finder system 116 applies general rules, override rules and user-defined rules to the input data. Each rule is turned into a mask with a mask value of $-2^N$ or $2^N$, where N is an incremental counter for the rules. It is understood that that the key terrain finder system 116 may assign rules with mask values other than $-2^N$ or $2^N$. Further details regarding each category of rules are described in further detail below.

The general rules are used to eliminate common non-key terrain areas. For example, common non-key terrain areas may include terrain areas that are too steep, water bodies, and large flat fields. Each general rule is turned into a general rule mask with a value of $-2^N$ or $2^N$, where N is an incremental counter for the rules.

Figure 4:
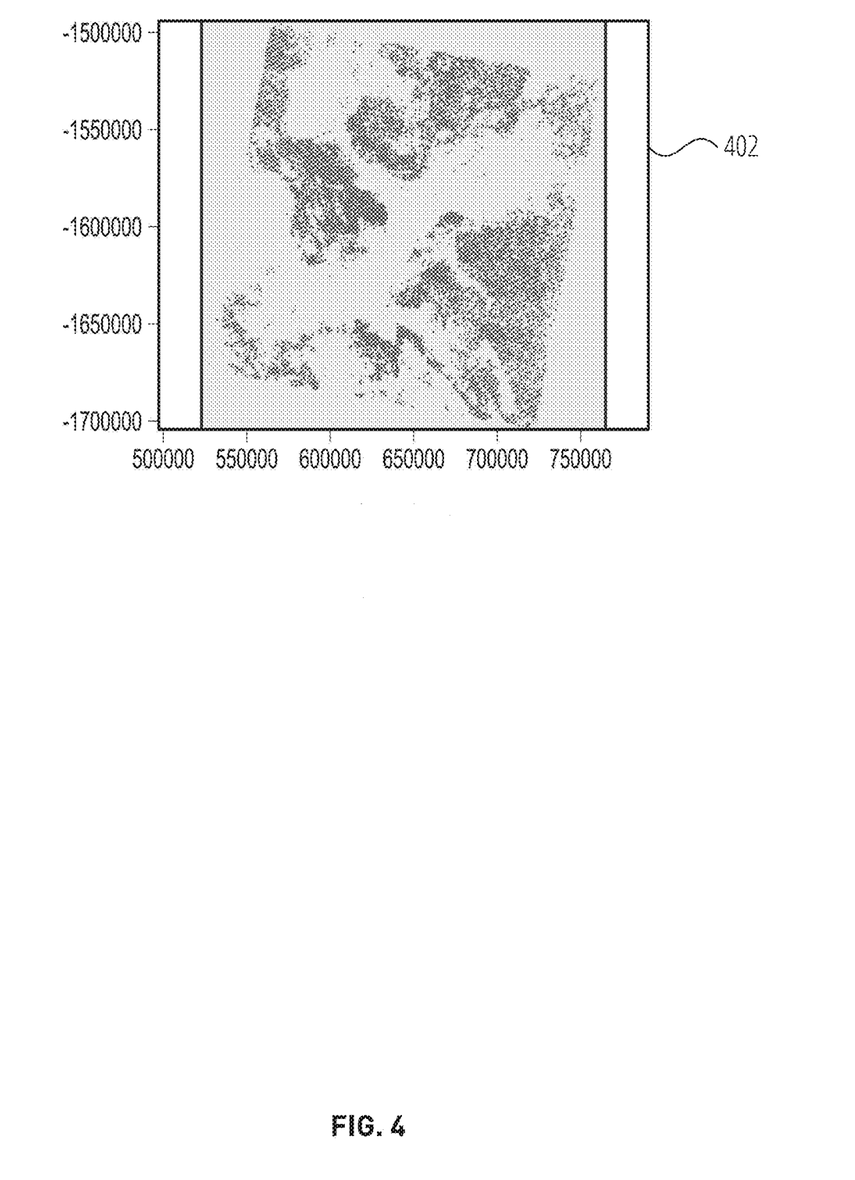
FIG. 4 is an illustration of a mask image, according to some example embodiments.
Figure 5:
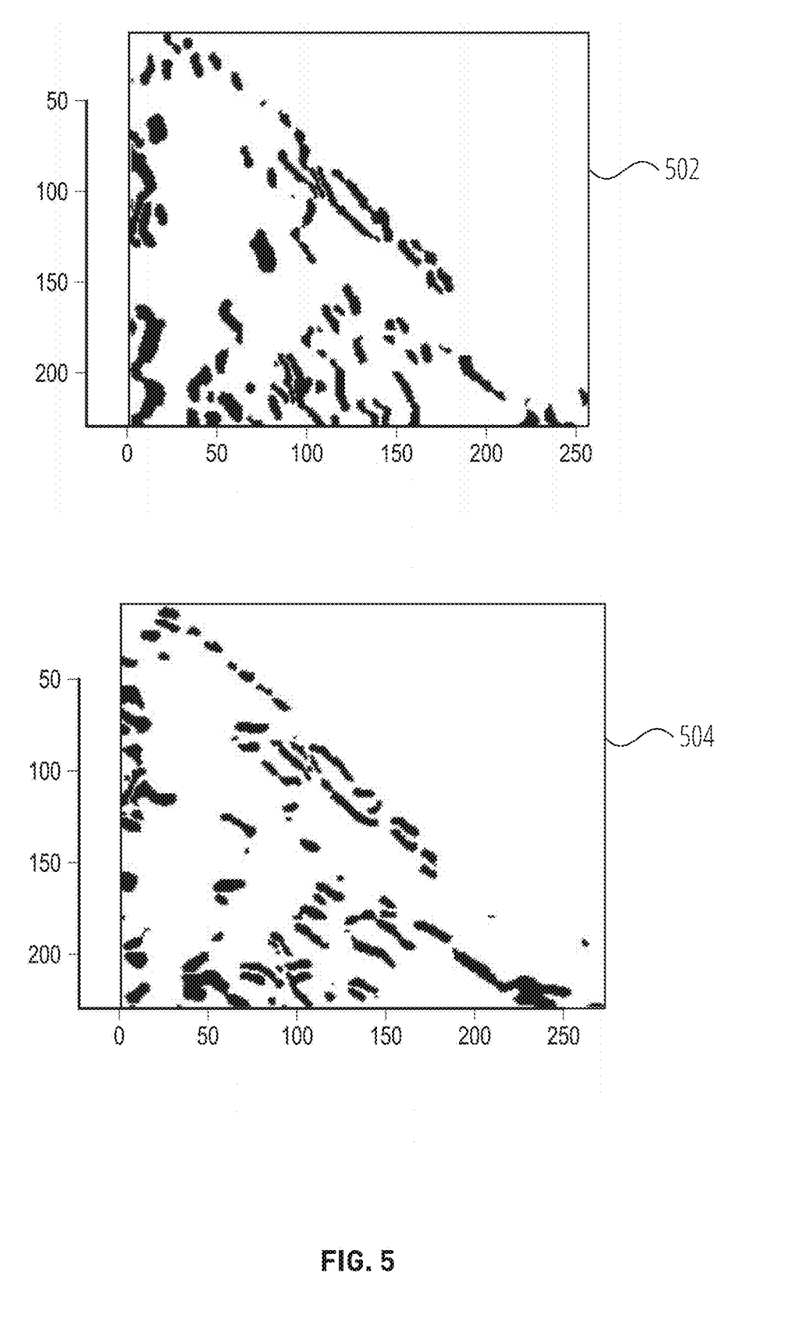
FIG. 5 is an illustration of a mask image, according to some example embodiments.

FIGS. 4-5 illustrate example general rule masks. Each general rule mask may be accessed by the key terrain finder system 116. For example, the general rule masks may be accessed from a database 120 or third-party applications 840.

FIG. 4 is an illustration of a normalized difference vegetation index (NDVI) general mask 402. The rule correlating to the NDVI general mask 402 may, for example, state that areas with dense vegetation are likely not key terrain due to lack of visibility of the surrounding area. The NDVI general mask 402 may be assigned a mask value of N=1. Thus, areas with dense vegetation are assigned a score of $-(2^1)=-2$ and areas with little or no vegetation are assigned a score of $2^1=2$. A higher score (e.g., a score of 2) may indicate a higher pixel value. Thus, the brighter pixels in FIG. 4 may indicate possible key-terrain areas.

FIG. 5 is an illustration of two gradient general masks: longitude mask 502 and a latitude mask 504. The rule corresponding to the longitude mask 502 and latitude mask 504 may state that areas that are too steep are impassable. For example, the longitude mask 502 may be assigned a mask value of N=3 and the latitude mask may be assigned a mask value of N=4. Thus, areas which are too steep based on the longitude and latitude may be assigned scores of $-8$ and $-16$, and areas which are likely to be key terrain may be assigned scores of 8 or 16, respectively.

The general rule masks may be summed into a summed general mask. Higher scores indicate an area is more likely to be key terrain because more than one general rule tagged the area as potential key terrain. Conversely, lower scores indicate an area is likely not key terrain because more than one general rule tagged the area as non-key terrain. For example, the NDVI general mask 402 may assign a terrain feature a score of 2 indicating possible key terrain because there is little or no vegetation. However, the longitude mask 502 and the latitude mask 504 may assign that terrain feature scores of $-8$ and $-16$, respectively, indicating that the terrain feature is not key terrain because it is too steep and thus impassible. Therefore, the summed general mask would assign a score of $(2+-8\pm-16=-22)$ for that terrain feature, indicating that the terrain feature is not key terrain.

In addition to general rule masks, the key terrain finder system 116 accesses override rule masks. The override rule masks may be accessed from a database 120 or third-party applications 840. The override rule masks correlate to override rules which include logic to override the general rules. For example, a general rule may state that a water body is not common key terrain. However, a biome override rule may state that a water body may be key terrain if the water body is located in a desert. In another example, a general rule may state that large flat fields may not be common key-terrain. However, a road override rule may state that roads or bridges converging at a choke point in a flat field may be key terrain. Similarly, dense vegetation, such as that of a forest may not be key terrain as defined by a general rule. But the road override rule may state that a road through a forest or canopy may be key terrain, in another example, borders and coastlines may not be common key terrain. But an override rule may state that ports or border points of entry along borders and coastlines may be key terrain.

Override masks are given higher N values because they can negate a general rule. For example, a general rule which classified a water body as non key terrain would have a $-2^N$ value assigned to it. However, if an override rule (e.g., correlating to a biome rule) now classifies water bodies in a desert as key terrain, the water body now has a total mask value of $-2^N+2'$, where NB is much greater than N. A similar concept applies for roads and/or bridges overlaid on areas that were previously not considered key terrain (e.g., forests, large flat fields, water).

The key terrain finder system 116 also accesses user-defined rule masks which correlate to user-defined rules. The user-defined rule masks may be accessed from a database 120 or third-party applications 840. User-defined rule masks have very high N values because they have an overarching override capability. While an override rule may override a general rule, user-defined rules may further override the override rule. Users (e.g., units) may have knowledge of local conditions that make a previously passable area, impassable, or vice versa, Local conditions may include weather conditions, recent mudslides or minefield locations. In some examples unit information such as size of the unit, equipment, mission or task related constraints, may further define what is or is not key terrain. For example, a hilltop may be assigned a value of $2^7$ because the high vantage point is key terrain. However, a user-defined rule describing unit equipment may be assigned a value of $2^{16}$ because the unit consists of large and heavy tanks which are incapable of clearing the steep incline to the hilltop. Thus, the high N value will clearly flag the user-defined mask as a user override.

Figure 6:
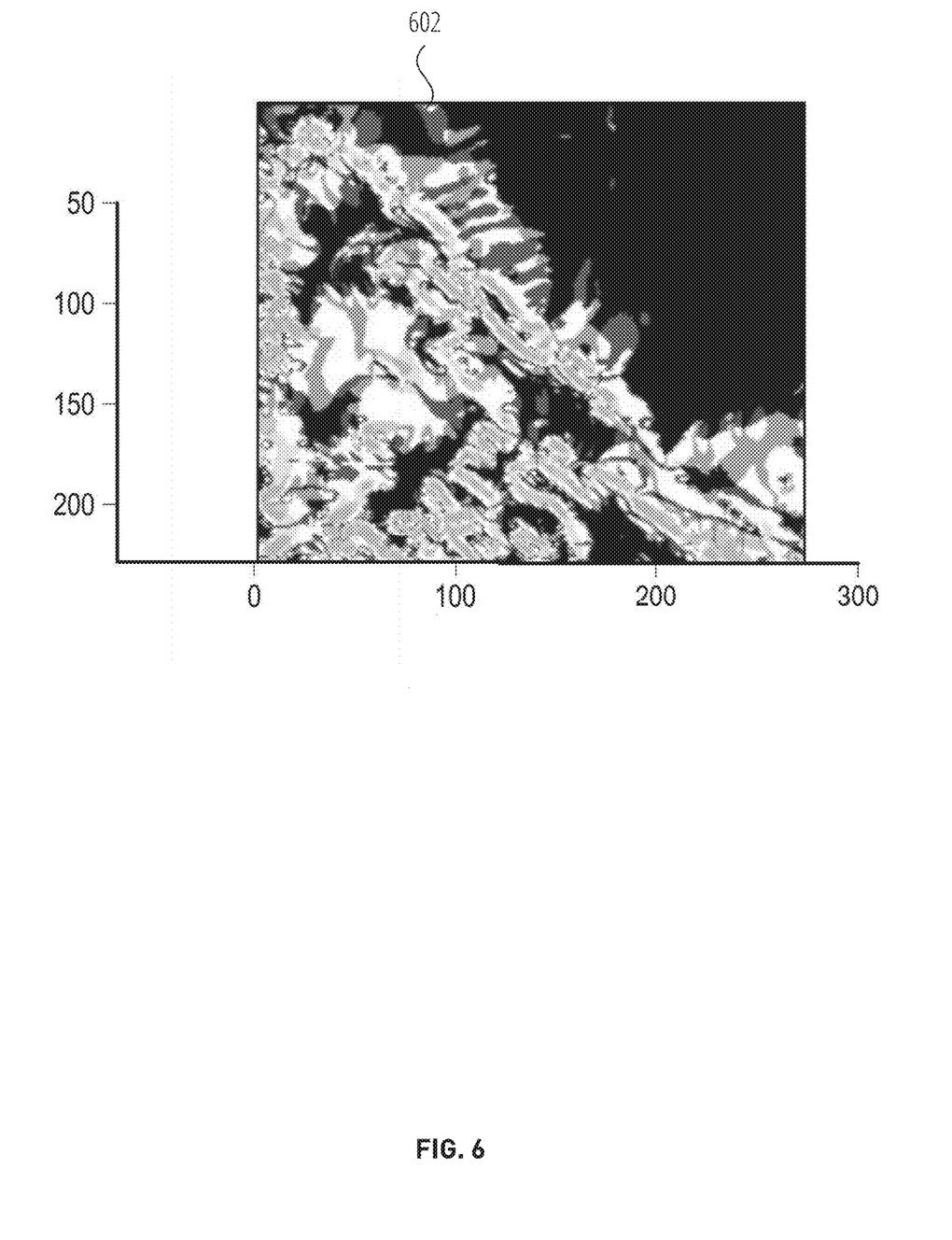
FIG. 6 is an illustration of a final mask image, according to some example embodiments.

FIG. 6 is an illustration of a final key terrain mask 602. The key terrain finder system 116 generates a final key terrain mask 602 which is a summation of all masks: general rule masks, override masks and user-defined masks. The resulting mask may be a greyscale set of values with a unique representation that can be decomposed into the individual masks that generated the final sum value. Thus, the key terrain finder system 116 preserves information pedigree. The final key terrain mask 602 also represents a likelihood that a given terrain feature is key terrain. For example, the brighter the area, the more likely the area is key terrain. In some examples, the final key terrain mask 602 is a colorized image and key terrain areas are depicted in or outlined in one or more predetermined colors.

Users may provide feedback based on the final key terrain mask 602 and rules can be rearranged within the key terrain finder system 116. For example, masks may be manually assigned different N values to better align with importance of the rule according to the user. Additional rules may also be generated by the user to further describe mission or tasks specific context.

In some examples, each general rule mask, override rule mask and user-defined rule mask may assign values of 0 (e.g., indicating non key terrain) or $2^N$ indicating key terrain). The key terrain finder system 116 may thus generate two different versions of each mask. A first version may assign non key terrain areas a value of 0 and possible key terrain areas as $2^N$. The first version is thus a binary representation of non key terrain areas and key terrain areas. The second version may assign non key terrain areas a value of $-2^N$ and possible key terrain areas as $2^N$, as discussed in the paragraphs above. The second version thus maintains information pedigree such that a user can identify the individual masks that contributed to the final mask value. Each of the general rule masks, override rule masks and user-defined masks may be stored separately in a database 120.

Figure 7:
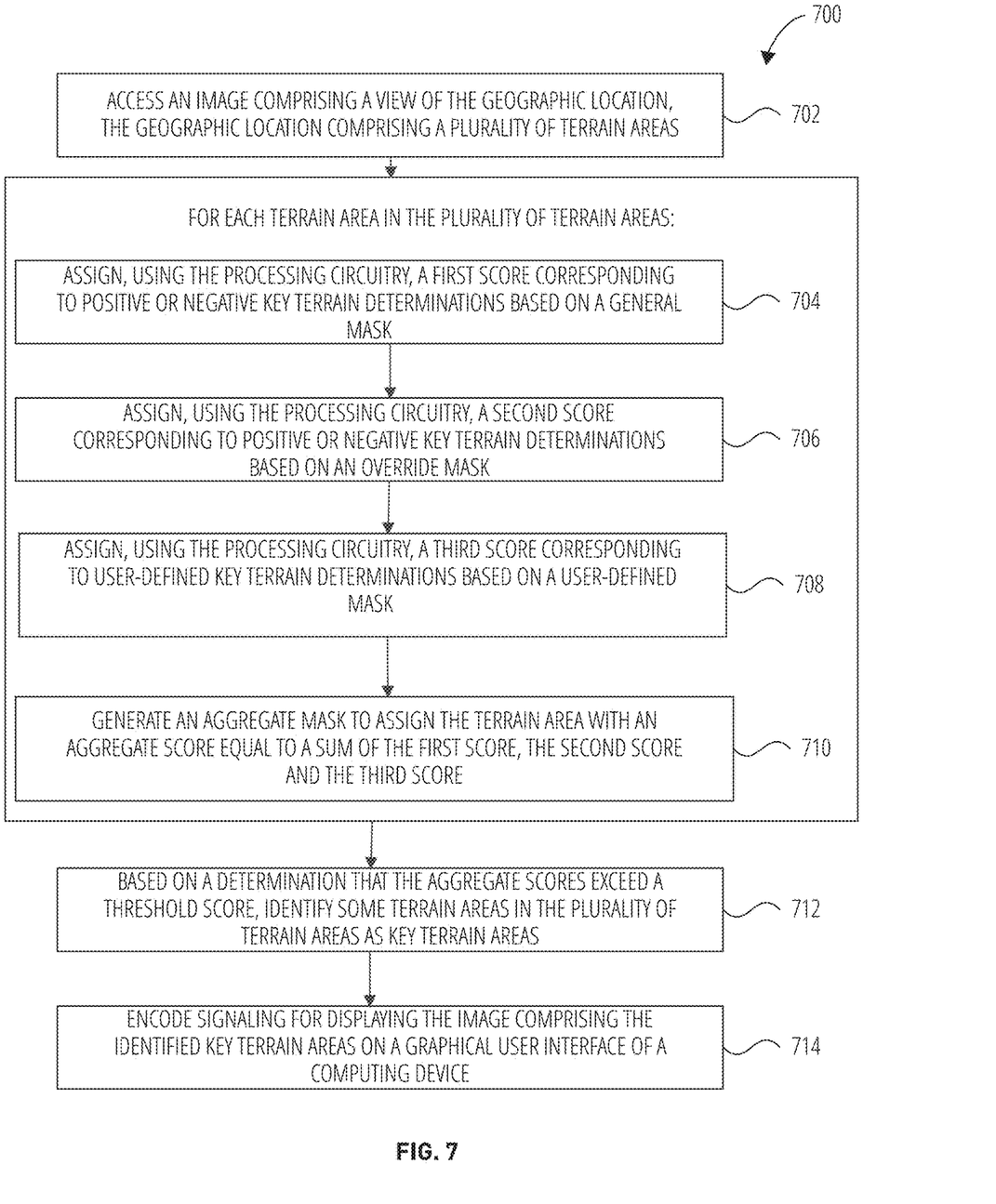
FIG. 7 is a flow chart of a method for identifying key terrain, according to some example embodiments.

FIG. 7 is a flowchart of an example method 700 for identifying key terrain, according to some example embodiments. In operation 702, the key terrain finder system 116 accesses an image comprising a view of the geographic location, the geographic location comprising a plurality of terrain areas terrain features). For example, the key terrain finder system 116 may access the PAN image 202.

For each terrain area, the key terrain finder system 116 in operation 704, assigns a first score corresponding to positive or negative key terrain determinations based on a general mask describing physical features of the geographic location, wherein the general mask is generated from a general rule. As described above, the general rule eliminates common key terrain areas. A positive key terrain determination may correlate to a score of $2^N$ and a negative key terrain determination may correlate to a score of $-2^N$. The general mask, for example, may be an NDVI mask or gradient masks as depicted by FIGS. 4-5. As discussed above, each rule is associated with a unique N value.

For each terrain area in the plurality of terrain areas, the key terrain finder system 116 may identify a first portion of the image correlating to a first set of pixel values using the general rule. The key terrain finder system 116 converts each pixel value in the first set of pixel values to the first score to generate a general mask image. For example, based on the general rule, some pixel values in the originally accessed image may be converted to a positive key terrain determination (e.g., $2^N$), and some pixel values may be converted to a negative key terrain determination (e.g., $-2^N$). The general mask image may be stored in a database 120 to preserve information pedigree.

In operation 706, the key terrain finder system 116 assigns a second score corresponding to positive or negative key terrain determinations based on an override mask describing exceptions to the general mask, wherein the override mask is generated from an override rule, the second score having a greater weight than the first score. The override rule, described in further detail above, uses logic to override a general rule. Thus, override rules have a higher N value (e.g., greater weight) than general rules.

For each terrain area in the plurality of terrain areas, the key terrain finder system 116 may identify a second portion of the image correlating to a second set of pixel values using the override rule. The key terrain finder system 116 image converts each pixel value in the second set of pixel values to the second score to generate an override mask image. For example, based on the override rule, some pixel values in the originally accessed image may be converted to a positive key terrain determination (e.g., $2^N$), and some pixel values may be converted to a negative key terrain determination (e.g., $-2^N$). The override mask image may be stored in a database 120 to preserve information pedigree.

In operation 708, the key terrain finder system 116 assigns a third score corresponding to user-defined key terrain determinations based on a user-defined mask describing mission specific information, wherein the user-defined mask is generated from a user-defined rule, the third score having a greater weight than the second score. The user-defined rules have the highest N values (e.g., greater weight than the override rules and the general rules) so as to override both override rules and general rules. The user-defined key terrain determinations correlate to positive key terrain determinations (e.g., $2^N$) or negative key terrain determinations (e.g., $-2^N$) based on the user-defined rules. The user-defined rules may be received by the key terrain finder system 116 in the form of a user-input to a computing device.

For each terrain area in the plurality of terrain areas, the key terrain finder system 116 may identify a third portion of the image correlating to a third set of pixel values using the user-defined rules. The key terrain finder system 116 image converts each pixel value in the third set of pixel values to the third score to generate a user-defined mask image. For example, based on the user-defined rule, some pixel values in the originally accessed image may be converted to a positive key terrain determination (e.g., $2^N$), and some pixel values may be converted to a negative key terrain determination (e.g., $-2^N$). The user-defined mask image may be stored in a database 120 to preserve information pedigree.

In operation 710, the key terrain finder system 116 generates an aggregate mask to assign the terrain area with an aggregate score equal to a sum of the first score, the second score and the third score. For example, the aggregate mask may be the final key terrain mask illustrated in FIG. 6. A high aggregate score may correlate to brighter pixel values.

The key terrain finder system 116 may thus generate an aggregate mask image. The aggregate mask image has a fourth set of pixel values which represents a sum of the pixel values of the general mask images, the override mask images and the user-defined mask images.

Based on a determination that the aggregate scores exceed a threshold score, the key terrain finder system 116 identifies some terrain areas in the plurality of terrain areas as key terrain areas. In some examples, the threshold score may be zero. In some examples, the threshold score may be defined by a user of the key terrain finder system 116.

In operation 714, the key terrain finder system 116 encodes signaling for displaying the image comprising the identified key terrain areas on a graphical user interface of a computing device. In some examples, the final key terrain mask 602 (e.g., aggregate mask) may be applied to the accessed image of the geographic location. In applying the final key terrain mask 602 to the PAN image 202, the key terrain finder system 116 modifies the pixels of the PAN image 202 by replacing the original pixel values with the pixel values of the aggregate mask image (e.g., corresponding to the sum of the pixel values of the general mask images, the override mask images and the user-defined mask images).

In some examples, the key terrain finder system 116 generates a ranked list of key terrain areas based on their respective aggregate scores. The key terrain finder system 116 may encode signaling for displaying the ranked list of the key terrain areas on the graphical user interface of the computing device.

Figure 8:
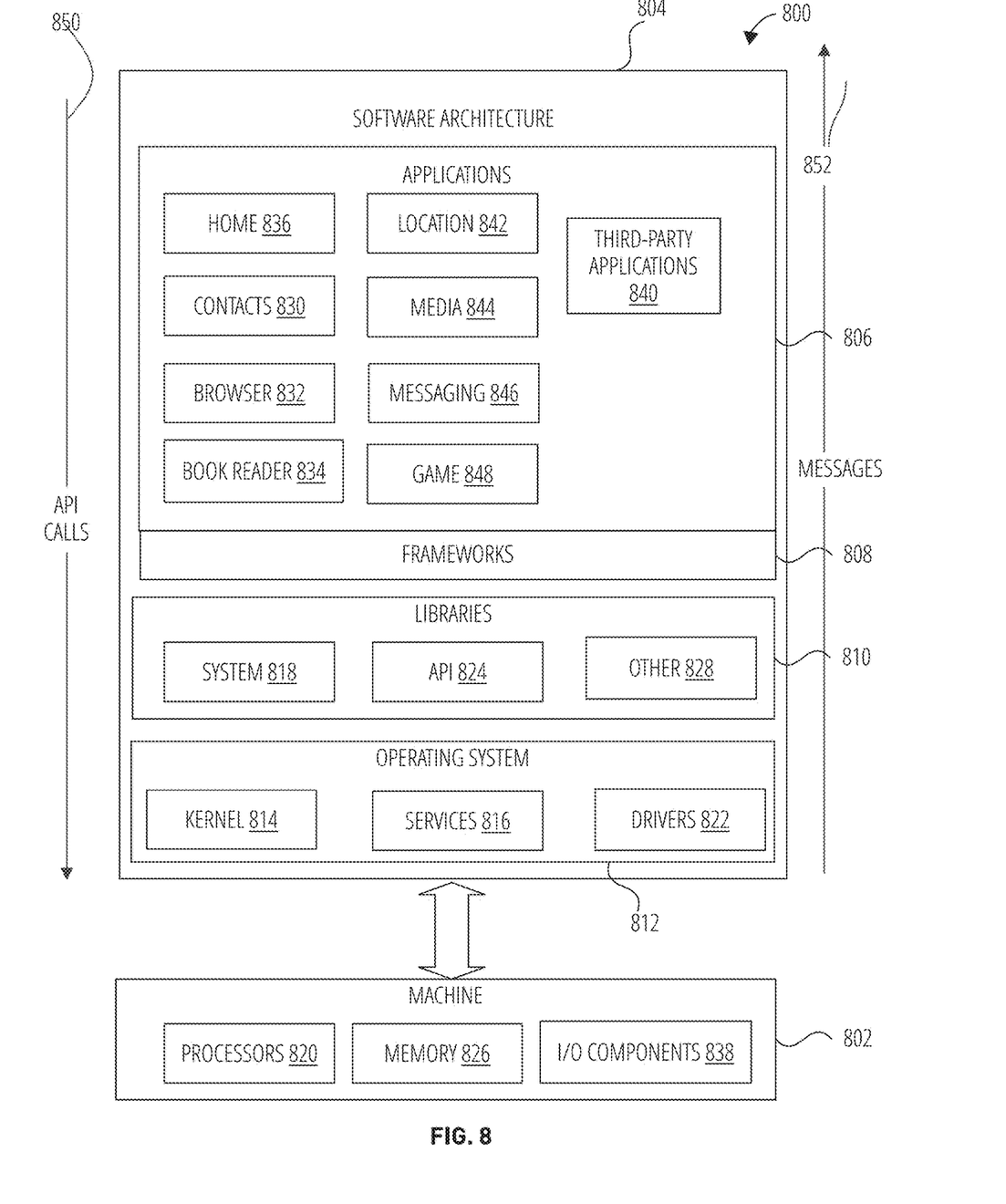
FIG. 8 is a block diagram showing a software architecture within which the present disclosure may be implemented, in accordance with some example embodiments.

FIG. 8 is a block diagram 800 illustrating a software architecture 804, which can be installed on any one or more of the devices described herein. The software architecture 804 is supported by hardware such as a machine 802 that includes processors 820, memory 826, and I/O components 838. In this example, the software architecture 804 can be conceptualized as a stack of layers, where each layer provides a particular functionality. The software architecture 804 includes layers such as an operating system 812, libraries 810, frameworks 808, and applications 806. Operationally, the applications 806 invoke API calls 850 through the software stack and receive messages 852 in response to the API calls 850.

The operating system 812 manages hardware resources and provides common services. The operating system 812 includes, for example, a kernel 814, services 816, and drivers 822. The kernel 814 acts as an abstraction layer between the hardware and the other software layers. For example, the kernel 814 provides memory management, processor management (e.g., scheduling), component management, networking, and security settings, among other functionality. The services 816 can provide other common services for the other software layers. The drivers 822 are responsible for controlling or interfacing with the underlying hardware. For instance, the drivers 822 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 810 provide a low-level common infrastructure used by the applications 806. The libraries 810 can include system libraries 818 (e.g., C standard library) that provide functions such as memory allocation functions, string manipulation functions, mathematic functions, and the like. In addition, the libraries 810 can include API libraries 824 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 810 can also include a wide variety of other libraries 828 to provide many other APIs to the applications 806.

The frameworks 808 provide a high-level common infrastructure that is used by the applications 806. For example, the frameworks 808 provide various graphical user interface (GUI) functions, high-level resource management, and high-level location services. The frameworks 808 can provide a broad spectrum of other APIs that can be used by the applications 806, some of which may be specific to a particular operating system or platform.

In an example embodiment, the applications 806 may include a home application 836, a contacts application 830, a browser application 832, a book reader application 834, a location application 842, a media application 844, a messaging application 846, a game application 848, and a broad assortment of other applications such as third-party applications 840. The applications 806 are programs that execute functions defined in the programs. Various programming languages can be employed to create one or more of the applications 806, structured in a variety of manners, such as object-oriented programming languages (e.g., Objective-C, Java, or C++) or procedural programming languages (e.g., C or assembly language). In a specific example, the third-party applications 840 (e.g., applications developed using the ANDROID™ or IOS™ software development kit (SDK) by an entity other than the vendor of the particular platform) may be mobile software running on a mobile operating system such as IOS™, ANDROM™, WINDOWS® Phone, or another mobile operating system. In this example, the third-party applications 840 can invoke the API calls 850 provided by the operating system 812 to facilitate functionality described herein.

Figure 9:
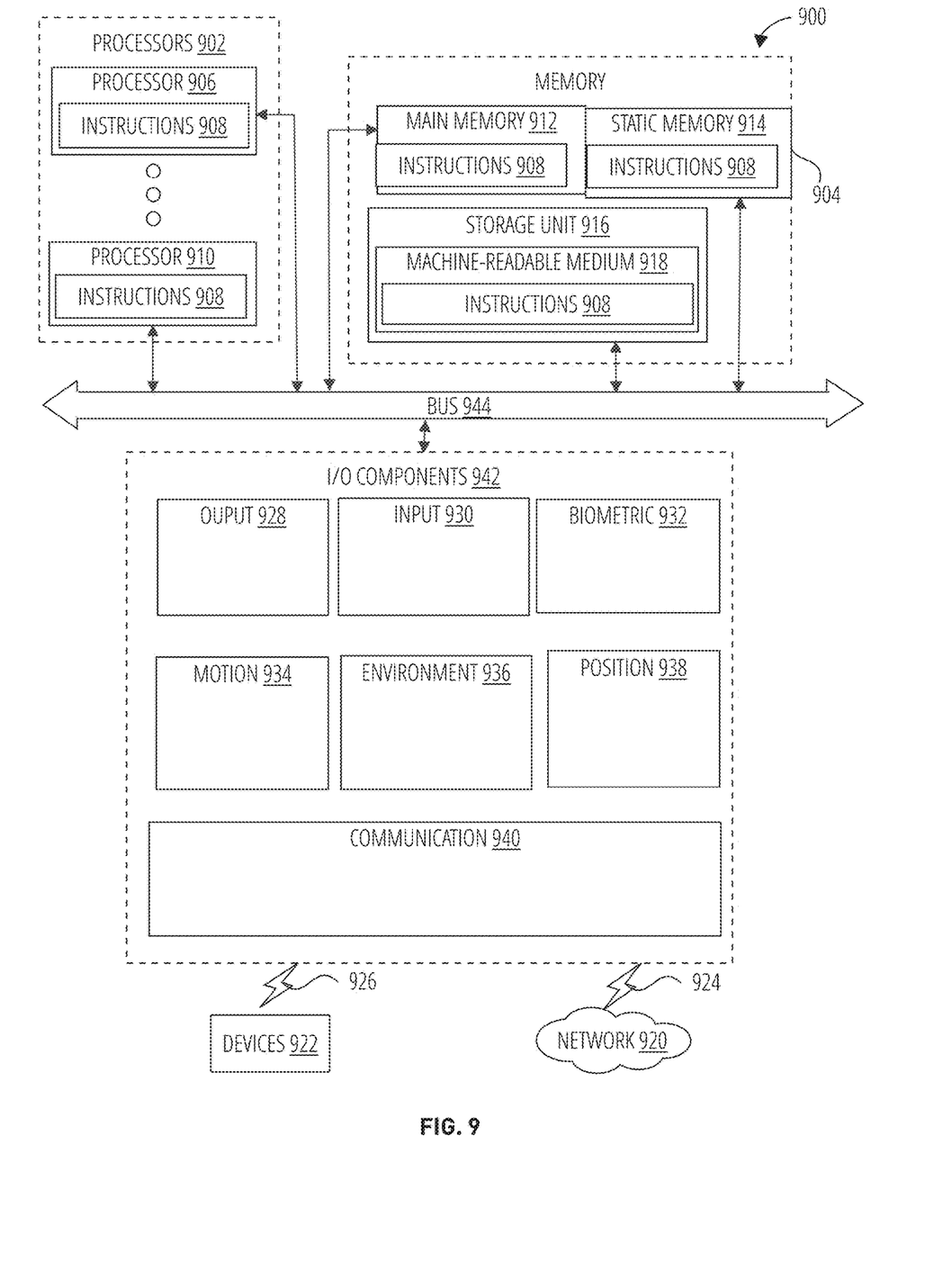
FIG. 9 is a diagrammatic representation of a machine, in the form of a computer system within which a set of instructions may be executed for causing the machine to perform any one or more of the methodologies discussed, in accordance with some example embodiments.

FIG. 9 is a diagrammatic representation of a machine 900 within which instructions 908 (e.g., software, a program, an application, an applet, an app, or other executable code) for causing the machine 900 to perform any one or more of the methodologies discussed herein may be executed. For example, the instructions 908 may cause the machine 900 to execute any one or more of the methods described herein. The instructions 908 transform the general, non-programmed machine 900 into a particular machine 900 programmed to carry out the described and illustrated functions in the manner described. The machine 900 may operate as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device e.g., a smart watch), a smart home device (e.g., a smart appliance), other smart devices, a web appliance, a network router, a network switch, a network bridge, or any machine capable of executing the instructions 908, sequentially or otherwise, that specify actions to be taken by the machine 900. Further, while only a single machine 900 is illustrated, the term "machine" shall also be taken to include a collection of machines that individually or jointly execute the instructions 908 to perform any one or more of the methodologies discussed herein.

The machine 900 may include processors 902, memory 904, and I/O components 942, which may be configured to communicate with each other via a bus 944. In an example embodiment, the processors 902 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency integrated Circuit (RFIC), another processor, or any suitable combination thereof) may include, for example, a processor 906 and a processor 910 that execute the instructions 908. The term "processor" is intended to include multi-core processors that may comprise two or more independent processors (sometimes referred to as "cores") that may execute instructions contemporaneously. Although FIG. 9 shows multiple processors 902, the machine 900 may include a single processor with a single core, a single processor with multiple cores (e.g., a multi-core processor), multiple processors with a single core, multiple processors with multiples cores, or any combination thereof.

The memory 904 includes a main memory 912, a static memory 914, and a storage unit 916, both accessible to the processors 902 via the bus 944. The main memory 904, the static memory 914, and storage unit 916 store the instructions 908 embodying any one or more of the methodologies or functions described herein. The instructions 908 may also reside, completely or partially, within the main memory 912, within the static memory 914, within machine-readable medium 918 within the storage unit 916, within at least one of the processors 902 (e.g., within the processor's cache memory), or any suitable combination thereof, during execution thereof by the machine 900.

The I/O components 942 may include a wide variety of components to receive input, provide output, produce output, transmit information, exchange information, capture measurements, and so on. The specific I/O components 942 that are included in a particular machine will depend on the type of machine. For example, portable machines such as mobile phones may include a touch input device or other such input mechanisms, while a headless server machine will likely not include such a touch input device. It will be appreciated that the I/O components 942 may include many other components that are not shown in FIG. 9. In various example embodiments, the components 942 may include output components 928 and input components 930. The output components 928 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 942 may include biometric components 932, motion components 934, environmental components 936, or position components 938, among a wide array of other components. For example, the biometric components 932 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 934 include acceleration sensor components (e.g., accelerometer), gravitation sensor components, rotation sensor components (e.g., gyroscope), and so forth. The environmental components 936 include, for example, illumination sensor components (e.g., photometer), temperature sensor components one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 938 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 942 further include communication components 940 operable to couple the machine 900 to a network 920 or devices 922 via a coupling 924 and a coupling 926, respectively. For example, the communication components 940 may include a network interface component or another suitable device to interface with the network 920. In further examples, the communication components 940 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 922 may be another machine or any of a wide variety of peripheral devices (e.g., a peripheral device coupled via a USB).

Moreover, the communication components 940 may detect identifiers or include components operable to detect identifiers. For example, the communication components 940 may include Radio Frequency Identification (RFII)) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 940, such as location via Internet Protocol (LP) geolocation, location via Wi-Fi® signal triangulation, location via detecting an NFC beacon signal that may indicate a particular location, and so forth.

The various memories (e.g., memory 904, main memory 912, static memory 914, and/or memory of the processors 902) and/or storage unit 916 may store one or more sets of instructions and data structures (e.g., software) embodying or used by any one or more of the methodologies or functions described herein. These instructions (e.g., the instructions 908), when executed by processors 902, cause various operations to implement the disclosed embodiments.

The instructions 908 may be transmitted or received over the network 920, using a transmission medium, via a network interface device (e.g., a network interface component included in the communication components 940) and using any one of a number of well-known transfer protocols (e.g., hypertext transfer protocol (HTTP)). Similarly, the instructions 908 may be transmitted or received using a transmission medium via the coupling 926 (e.g., a peer-to-peer coupling) to the devices 922.

What is claimed is:

1. An apparatus configured to identify key terrain areas in a geographic location, the apparatus comprising:
 processing circuitry; and memory, wherein the processing circuitry is configured to:
  access an image comprising a view of the geographic location, the geographic location comprising a plurality of terrain areas;
  for each terrain area in the plurality of terrain areas:
  assign, using the processing circuitry, a first score corresponding to positive or negative key terrain determinations based on a general mask;
  assign, using the processing circuitry, a second score corresponding to positive or negative key terrain determinations based on an override mask;
  assign, using the processing circuitry, a third score corresponding to user-defined key terrain determinations based on a user-defined mask;

generate an aggregate mask to assign the terrain area with an aggregate score based on the first score, the second score and the third score;

based on a determination that the aggregate scores exceed a threshold score, identify some terrain areas in the plurality of terrain areas as key terrain areas; and encode signaling for displaying the image comprising the identified key terrain areas on a graphical user interface of a computing device.

2. The apparatus of claim 1, wherein the general mask describes physical features of the geographic location and is generated from a general rule;

wherein the override mask describes exceptions to the general mask and is generated from an override rule, the second score having a greater weight than the first score;

wherein the user-defined mask describes mission specific information and is generated from a user-defined rule, the third score having a greater weight than the second score; and wherein the aggregate score equals a sum of the first score, the second score and the third score.

3. The apparatus of claim 1, wherein the processing circuitry is further configured to:

identify at least a first portion of the image using the eneral mask, at least the first portion of the image comprising a first set of pixel values;

generate a general mask image representing at least the first portion of the image by, converting each pixel value in the first set of pixel values to the first score;

identify at least a second portion of the image using the override mask, at least the second portion of the image comprising a second set of pixel values;

generate an override mask image representing at least the second portion of the image by converting each pixel value in the second set of pixel values to the second score;

identify at least a third portion of the image using the user-defined mask, at least the third portion of the image comprising a third set of pixel values; and generate a user-defined mask image representing at least the third portion of the image by converting each pixel value in the third set of pixel values to the third score.

4. The apparatus of claim 2, wherein the processing circuitry is further configured to:

generate an aggregate mask image comprising a fourth set of pixel values representing a sum of a first set of pixel values, a second set of pixel values and a third set of pixel values.

5. The apparatus of claim 4, wherein the aggregate mask image is a greyscale or colorized image and each pixel value in the fourth set of pixel values corresponds to a unique greyscale or colorized value.

6. The apparatus of claim 1, wherein the processing circuitry is further configured to:

receive an input comprising a user-defined rule; and
access the user-defined mask based on the user-defined rule.

7. The apparatus of claim 1, wherein a general rule comprises at least one of latitude information, longitude information, vegetation information or elevation information.

8. The apparatus of claim 1, wherein an override rule comprises at least one of biome information, border points of entry information or road information.

9. The apparatus of claim 1, wherein a user-defined rule comprises at least one of equipment information, minefield locations or recent weather conditions.

10. The apparatus of claim 1, wherein the threshold score is equal to zero.

11. The apparatus of claim 1, wherein the aggregate mask is applied to the accessed image to generate a modified image by modifying existing pixel values in the accessed image to their corresponding aggregate scores.

12. The apparatus of claim 1, wherein the processing circuitry is further configured to:

generate a ranked list of the key terrain areas based on their respective aggregate scores; and encode signaling for displaying the ranked list of the key terrain areas on the graphical user interface of the computing device.

13. The apparatus of claim 1, wherein the user-defined key terrain determinations are positive or negative key terrain determinations.

14. The apparatus of claim 1, wherein the processing circuitry is further configured to:

assign the first score corresponding to the positive or negative key terrain determinations based on a set of general masks, wherein each general mask in the set of general masks is generated based on a corresponding general rule;

generate a summed general mask based on a sum of the corresponding general rule associated with each general mask; and store each general mask individually to retain information pedigree.

15. A computer-implemented method for identifying key terrain in a geographic location, the method comprising:

accessing an image comprising a view of the geographic location, the geographic location comprising a plurality of terrain areas;

for each terrain area in the plurality of terrain areas:

assigning, using processing circuitry, a first score corresponding to positive or negative key terrain determinations based on a general mask;

assigning, using the processing circuitry, a second score corresponding to positive or negative key terrain determinations based on an override mask;

assigning, using the processing circuitry, a third score corresponding to user-defined key, terrain determinations based on a user-defined mask;

generating an aggregate mask to assign the terrain area with an aggregate score based on the first score, the second score and the third score;

based on a determination that the aggregate scores exceed a threshold score, identifying some terrain areas in the plurality of terrain areas as key terrain areas; and encoding signaling for displaying the image comprising the identified key terrain areas on a graphical user interface of a computing device.

16. The method of claim 15, wherein the general mask describes physical features of the geographic location and is generated from a general rule;

wherein the override mask describes exceptions to the general mask and is generated from an override rule, the second score having a greater weight than the first score;

wherein the user-defined mask describes mission specific information and is generated from a user-defined rule, the third score having a greater weight than the second score; and wherein the aggregate score equals a sum of the first score, the second score and the third score.

17. The method of claim 15, further comprising:

identifying at least a first portion of the image using the general mask, at least the first portion of the image comprising a first set of pixel values;

generating a general mask image representing at least the first portion of the image by converting each pixel value in the first set of pixel values to the first score;

identifying at least a second portion of the image using the override mask, at least the second portion of the image comprising a second set of pixel values;

generating an override mask image representing at least the second portion of the image by converting each pixel value in the second set of pixel values to the second score;

identifying at least a third portion of the image using the user-defined mask, at least the third portion of the image comprising a third set of pixel values; and generating a user-defined mask image representing at least the third portion of the image by converting each pixel value in the third set of pixel values to the third score.

18. The method of claim 17, further configured to:

generating an aggregate mask image comprising a fourth set of pixel values representing a sum of the first set of pixel values, the second set of pixel values and the third set of pixel values.

19. The method of claim 18, wherein the aggregate mask image is a greyscale or colorized image and each pixel value in the fourth set of pixel values corresponds to a unique greyscale or colorized value.

20. A non-transitory computer-readable storage medium, the computer-readable storage medium including instructions that when executed by a processing circuitry, cause the processing circuitry to:

access an image comprising a view of a geographic location, the geographic location comprising a plurality of terrain areas;

for each terrain area in the plurality of terrain areas:

assign, using the processing circuitry, a first score corresponding to positive or negative key terrain determinations based on a general mask;

assign, using the processing circuitry, a second score corresponding to positive or negative key terrain determinations based on an override mask;

assign, using the processing circuitry, a third score corresponding to user-defined key terrain determinations based on a user-defined mask;

generate an aggregate mask to assign the terrain area with an aggregate score based on the first score, the second score and the third score;

based on a determination that the aggregate scores exceed a threshold score, identify some terrain areas in the plurality of terrain areas as key terrain areas; and encode signaling for displaying the image comprising the identified key terrain areas on a graphical user interface of a computing device.

\* \* \* \* \*

UNITED STATES PATENT AND TRADEMARK OFFICE
CERTIFICATE OF CORRECTION

| | | |
|---|---|---|
| PATENT NO. | : 11,625,914 B2 | Page 1 of 2 |
| APPLICATION NO. | : 17/064308 | |
| DATED | : April 11, 2023 | |
| INVENTOR(S) | : Sarah A. Crate | |

It is certified that error appears in the above-identified patent and that said Letters Patent is hereby corrected as shown below:

In the Drawings

Sheet 9 of 9, Fig. 9, reference numeral 928, Line 1, delete "OUPUT" and insert --OUTPUT-- therefor In the Specification In Column 5, Line 8, delete "that that" and insert --that-- therefor In Column 6, Line 7, delete "terrain, in" and insert --terrain. In-- therefor In Column 6, Line 17, delete "-$2^{N}+2'$," and insert -- -$2^{N}+2^{NB}$,-- therefor In Column 6, Line 30, delete "versa," and insert --versa.-- therefor In Column 6, Line 65, before "indicating", insert --(e.g.,--

In Column 7, Line 17, after "areas", insert --(e.g.,--

In Column 10, Line 1, delete "ANDROM™," and insert --ANDROID™,-- therefor

In Column 10, Line 28, delete "e.g.," and insert --(e.g.,-- therefor

In Column 10, Lines 45-46, delete "integrated" and insert --Integrated-- therefor In Column 11, Line 14, after "the", insert --I/O--

In Column 11, Line 22, after "The", insert --input components 930 may include alphanumeric input components (e.g., a--

In Column 11, Line 49, before "one", insert --(e.g.,--

Signed and Sealed this
Tenth Day of June, 2025

Coke Morgan Stewart
*Acting Director of the United States Patent and Trademark Office*

CERTIFICATE OF CORRECTION (continued)
U.S. Pat. No. 11,625,914 B2

In Column 12, Line 18, delete "(RFII))" and insert --(RFID)-- therefor

In Column 12, Line 29, delete "(LP)" and insert --(IP)-- therefor

In the Claims

In Column 13, Line 28, in Claim 3, delete "eneral" and insert --general-- therefor In Column 13, Line 31, in Claim 3, delete "by," and insert --by-- therefor In Column 14, Line 46, in Claim 15, delete "key," and insert --key-- therefor